(12) United States Patent
Haentzschel et al.

(10) Patent No.: US 7,574,184 B2
(45) Date of Patent: Aug. 11, 2009

(54) METHOD AND DEVICE FOR DETECTING OCCUPATION BY A SIGNAL OF AN ADJACENT CHANNEL

(75) Inventors: Dirk Haentzschel, Duerroehrsdorf-Dittersbach (DE); Eric Sachse, Dresden (DE); Michael Schmidt, Dresden (DE)

(73) Assignee: Atmel Germany GmbH, Heilbronn (DE)

( * ) Notice: Subject to any disclaimer, the term of this patent is extended or adjusted under 35 U.S.C. 154(b) by 482 days.

(21) Appl. No.: 11/513,257

(22) Filed: Aug. 31, 2006

(65) Prior Publication Data

US 2007/0047682 A1 Mar. 1, 2007

(30) Foreign Application Priority Data

Sep. 1, 2005 (DE) ........................ 10 2005 041 503

(51) Int. Cl.
*H04B 1/10* (2006.01)

(52) U.S. Cl. ..................... 455/226.1; 455/296; 375/348

(58) Field of Classification Search ................ 455/63.1, 455/67.11, 226.1, 226.2, 226.3, 229, 304, 455/307, 296; 375/322, 326, 340, 348

See application file for complete search history.

(56) References Cited

U.S. PATENT DOCUMENTS 6,081,559 A * 6/2000 Leclerc et al. .............. 375/326
6,473,417 B1 10/2002 Herzog
2003/0053562 A1* 3/2003 Busson et al. ............... 375/322
2004/0014424 A1 1/2004 Kristensson et al.
2004/0213328 A1 10/2004 Mills et al.
2004/0266383 A1 12/2004 Mattellini et al.

FOREIGN PATENT DOCUMENTS

WO    WO 01/93439 A1    12/2001
WO    WO 2004/098141 A1    11/2004

\* cited by examiner

*Primary Examiner*—Thanh C Le
(74) *Attorney, Agent, or Firm*—Muncy, Geissler, Olds & Lowe, PLLC (57) ABSTRACT

A method for detecting occupation of an adjacent channel by a signal with the aid of a complex-valued bandpass signal having an information channel component and/or an adjacent channel component. In accordance with the invention, a) a real-valued bandpass signal is derived in that the complex-valued bandpass signal is filtered and the real component is produced from the filtered signal, b) the real-valued bandpass signal is transposed into a first baseband signal, c) the first baseband signal is filtered so that spectral components influenced by the information channel component are suppressed, and d) the first filtered signal is evaluated and a binary occupation signal is generated to indicate the occupation of the adjacent channel as a function of the evaluated first filtered signal. The invention further discloses a corresponding device for detecting occupation, as well as a transmitting/receiving device and an integrated circuit having such a device.

26 Claims, 4 Drawing Sheets

METHOD AND DEVICE FOR DETECTING OCCUPATION BY A SIGNAL OF AN ADJACENT CHANNEL

This nonprovisional application claims priority under 35 U.S.C. § 119(a) on German Patent Application No. DE 102005041503, which was filed in Germany on Sep. 1, 2005, and which is herein incorporated by reference.

BACKGROUND OF THE INVENTION

1. Field of the Invention

The present invention relates to a method for detecting an occupation of an adjacent channel by a signal with the aid of a complex-valued bandpass signal having an information channel component and/or an adjacent channel component. The invention further relates to a corresponding device for detecting an occupation as well as a transmitting/receiving device and an integrated circuit having such a device.

2. Description of the Background Art

The invention is in the field of telecommunications. In particular, it is in the field of telecommunications systems, in which a number of transmitting/receiving devices access spectrally separated (carrier frequency) channels according to the frequency-division multiple access (FDMA) method. In this context, it is necessary in the receiving unit of each transmitting/receiving device to ensure, firstly, that the data received through its "own" channel ("information channel") is correctly detected, even when data of other transmitting/receiving devices is simultaneously being transmitted in a spectrally adjacent channel ("adjacent channel"), and the received signal therefore contains information channel components and adjacent channel components. It is also necessary to ensure that data transmitted in an adjacent channel and not intended for this transmitting/receiving device is not detected even if no data is being transmitted in the information channel and the received signal therefore contains only an adjacent channel component.

Adjacent channel signal components are typically suppressed in the receiving units of the transmitting/receiving devices by analog receive filters having adequately steep filter slopes. One disadvantage of this is that such receive filters are complex in their design and are thus cost-intensive. The complex design is also accompanied by an increased power consumption of the receive filter. Implementation expenses and power consumption increase further when measures must be taken to compensate for the variations in value of the components used for the analog receive filter resulting from production tolerances, temperature effects and/or aging effects.

Although they are applicable to any desired FDMA telecommunications systems, the present invention and the problem on which it is based are described below using a "Zig-Bee" communications system per IEEE 802.15.4.

So-called "Wireless Personal Area Networks" (WPANs) may be used for wireless transmission of information over relatively short distances (approximately 10 m). In contrast to Wireless Local Area Networks (WLANs), WPANs require little, or even no, infrastructure for data transmission, so that small, simple, energy-efficient and low-cost devices can be implemented for a wide range of applications.

IEEE Standard 802.15.4 specifies low-rate WPANs which, with raw data rates of up to 250 kbit/s and fixed-position or mobile devices, are suitable for applications in industrial monitoring and control, in sensor networks, in automation, as well as in the field of computer peripherals and for interactive games. The ability to implement the devices very simply and economically is critical for such applications, as is an extremely low power requirement. Hence, this standard aims for battery lifetimes of several months to several years.

At the level of the physical layer, IEEE Standard 802.15.4 specifies a total of 16 (carrier frequency) channels at 5 MHz intervals in the ISM band (industrial, scientific, medical) around 2.4 GHz, which is available almost worldwide. For raw data rates of 250 kbit/s a symbol-value-specific PN band spread (pseudo noise spreading) with a chip rate of $fC=2$ Mchip/s and offset QPSK modulation (quaternary phase shift keying) is provided in these channels.

Data transmission is chiefly accomplished with the use of frames. The actual useful data (data payload, MSDU) here are augmented on the transmit side at the level of the MAC layer (medium access control) by check and control data, such as a sequence number, address fields, and a frame check sequence. The resulting MAC frame (MPDU) is extended at the level of the physical layer by prepending additional control data, such as a synchronization header, which enables the receiving unit to synchronize and lock onto the data stream, to produce the data frame (PPDU) that is ultimately to be transmitted.

If the analog receive filters are designed with less steep slopes for reasons of complexity and energy consumption, and consequently the adjacent channel signal components are less strongly suppressed, the problem can arise that in situations where an adjacent channel signal is received but no information channel signal component is received, the adjacent channel data contained in the receive signal may be correctly detected as a result of the very high sensitivity of present-day receiving units and may be erroneously forwarded to the control unit of the transmitting/receiving device as information channel data. Not until the level of the MAC layer is it then determined in the control unit, for example by comparing the expected number or address with the actual number or address of the MAC frame (MPDU), that this frame is not intended for this transmitting/receiving device at all, for example, and must therefore be discarded. The complete data frame (PPDU) must be detected by the receiving unit before such a comparison of the numbers or addresses of the MAC frame (MPDU) can take place. A disadvantage here is that the receiving unit is unavailable during this period of time (duration of a PPDU) for detecting actual information channel data. A further disadvantage is that the control unit, which is often designed as a separate integrated circuit, consumes additional energy for the comparison of the numbers or addresses.

SUMMARY OF THE INVENTION

It is therefore an object of the present invention to provide a method and a device for quickly and reliably detecting occupation of an adjacent channel that make it possible to implement transmitting/receiving devices simply and economically, and to operate them in an energy-saving manner.

The inventive method provides the following steps: a) derivation of a real-valued bandpass signal in that the complex-valued bandpass signal is filtered and the real component is produced from the filtered signal, b) transposition of the real-valued bandpass signal into a first baseband signal, c) filtering of the first baseband signal so that spectral components influenced by the information channel component are suppressed, and provision of a first filtered signal, and d) evaluation of the first filtered signal and generation of a binary occupation signal to indicate the occupation of the adjacent channel as a function of the evaluated first filtered signal.

The inventive device includes at least the following units: a) an analog filter unit that is designed to derive a real-valued bandpass signal in that the complex-valued bandpass signal is filtered and the real component is produced from the filtered signal, b) a transformation unit that is connected to the analog filter unit and that is designed to transpose the real-valued bandpass signal into a first baseband signal, c) a digital filter unit that is connected to the transformation unit and that is designed to filter the first baseband signal such that spectral components influenced by the information channel component are suppressed, and to provide a first filtered signal, and d) an evaluation unit that is connected to the digital filter unit and that is designed to evaluate the first filtered signal and generate a binary occupation signal to indicate the occupation of the adjacent channel as a function of the evaluated first filtered signal.

The inventive transmitting/receiving device and the inventive integrated circuit can each have such a device.

In an embodiment, the present invention provides in first deriving, from the complex-valued bandpass signal—which for example is produced by mixing the received radio signal (received signal) down into an intermediate frequency range—a real-valued bandpass signal, in that the complex-valued bandpass signal is filtered and only the real component is produced from the resultant filtered signal. The real-valued bandpass signal thus produced has adjacent channel components and information channel components that partially overlap spectrally when both components are present. As a result of the only partial spectral overlap, spectral components that are not affected by the information channel component can be reliably selected by filtering and can be evaluated continuously, i.e. during reception of the data frame. Detection of the complete data frame is not necessary. The binary occupation signal, which indicates the occupation of the adjacent channel, is thus present at a significantly earlier point in time, e.g. even before detection of the actual data payload (MSDU). In this way, the occupation of the adjacent channel is detected quickly and reliably. If the adjacent channel is found to be occupied, the receiving unit can stand ready sooner for the detection of additional data.

In addition, as a result of the production of the real component of the filtered signal, the subsequent signal processing can be performed with real values so that, in particular, only one analog-to-digital converter is required (instead of two converters for complex-valued signal processing), which significantly reduces both the implementation effort and the energy consumption of the transmitting/receiving device. Since the further steps are also simple to realize, it is thus possible to implement transmitting/receiving devices simply and economically, and to operate them in an energy-saving manner.

In an embodiment, the first filtered signal is evaluated in that median values can be determined from values of a binary signal that is a function of the first filtered signal. Median values of binary (two-step) signal values can advantageously be determined in a very simple manner so that the implementation and energy consumption of transmitting/receiving devices is reduced still further.

In another embodiment of the invention, the first filtered signal can be evaluated in that average values (unweighted, weighted, RMS values, etc.) are determined from values of a signal that is a function of the first filtered signal. In this way, still more reliable detection of the adjacent channel occupation is advantageously possible.

According to a further embodiment of the invention, the binary occupation signal can be produced in that a first binary signal is combined with a second binary signal by a logic OR operation, wherein the first binary signal is produced by individually evaluating the values of the first filtered signal, and the second binary signal is produced by evaluating the values of the first filtered signal using a moving window. Through this combination of substantially instantaneous evaluation and evaluation with memory of the first filtered signal, a very reliable and fast detection of the occupation of the adjacent channel is achieved, since both brief high signal levels and longer-duration slightly increased levels are detected by the OR operation. As a result of the logical combination of binary signals, a further reduction in the implementation effort and energy consumption is achieved.

In another embodiment, the values of the first filtered signal can be individually evaluated by comparing their absolute values with a first comparison value, and the first binary signal takes on a value of logic 1 if the corresponding absolute value of the first filtered signal exceeds the first comparison value, and takes on a value of logic 0 if this is not the case. Such an evaluation is advantageously very easy to implement and energy-saving to carry out.

Preferably the first comparison value is a threshold value, which further simplifies implementation.

In another embodiment, each value of the second binary signal indicates a median of N values of a binary auxiliary signal, where N designates the window size, and the binary auxiliary signal is a function of the first filtered signal. The use of a binary, i.e. two-step, auxiliary signal simplifies the determination of the median so that the evaluation of the first filtered signal is less complicated overall.

Preferably the absolute values of the first filtered signal are compared with a second comparison value. The binary auxiliary signal takes on a value of logic 1 if the corresponding absolute value of the first filtered signal exceeds the second comparison value, and takes on a value of logic 0 if this is not the case. In this way, the binary auxiliary signal is derived in a simple way from the first filtered signal.

Preferably the second comparison value is a threshold value, which further simplifies implementation.

In another embodiment, the real-valued bandpass signal is additionally transposed into a second baseband signal that is filtered in such a manner that spectral components affected by the adjacent channel components are suppressed. The second filtered signal thus generated is likewise evaluated and the binary occupation signal is generated as a function of the evaluated first filtered signal and the evaluated second filtered signal. By this means, a still more reliable detection of adjacent channel occupation is advantageously possible.

Preferably the first comparison value, but preferably also the second comparison value, is a function of the second filtered signal in this context.

In another embodiment, the data values contained in the complex-valued bandpass signal can be detected and detection is terminated as soon as the binary occupation signal indicates the occupation of the adjacent channel. As a result of the termination of the detection process as soon as the adjacent channel has been found to be occupied, the receiving unit is advantageously available once again for the detection of additional data at an earlier point in time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Unless otherwise indicated, like and functionally like elements and signals are labeled with identical reference symbols in the figures.

Figure 1:
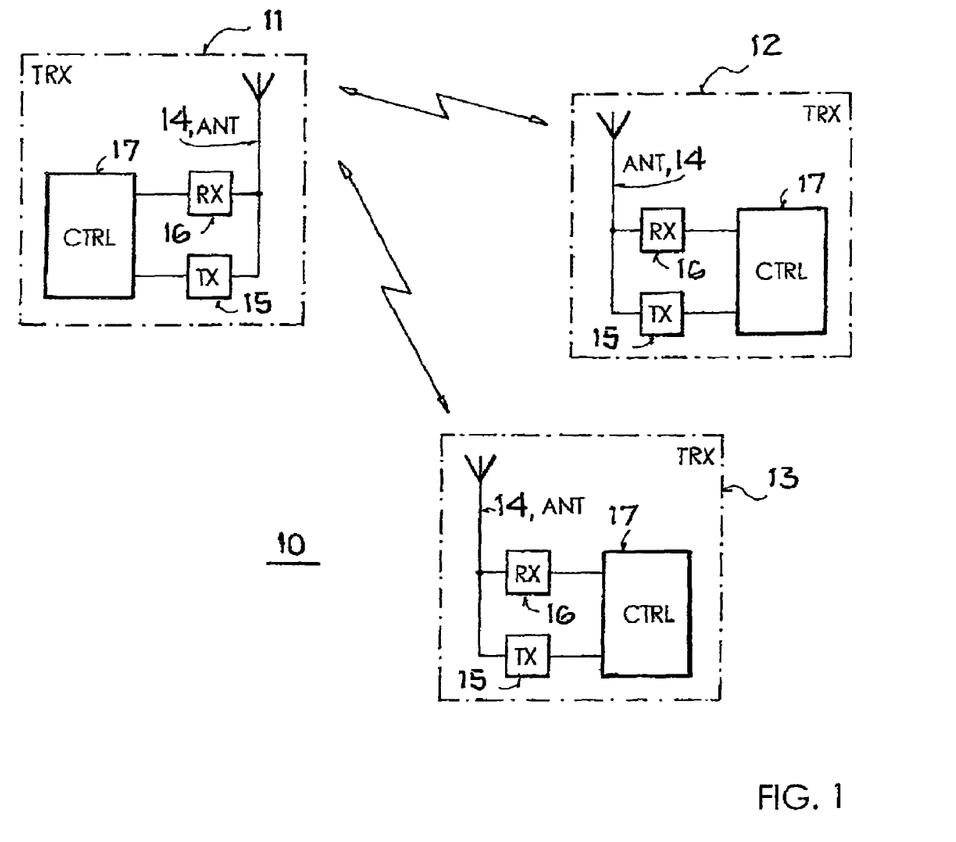
FIG. 1 shows an example of a Wireless Personal Area Network (WPAN) per IEEE 802.15.4 with inventive transmitting/receiving devices.

FIG. 1 shows an example of a Wireless Personal Area Network (WPAN) 10 per IEEE Standard 802.15.4. It is comprised of three transmitting/receiving devices (transceiver, TRX) 11-13 in the form of stationary or mobile devices that wirelessly exchange information by means of radio signals. The transmitting/receiving device 11 is what is known as a full-function device, which assumes the function of the WPAN coordinator, while the transmitting/receiving devices 12, 13 are so-called limited function devices, which are associated with the full-function device 11 and can exchange data only with it. In addition to the star-shaped network topology shown in FIG. 1, in which bidirectional data transmission can occur only between one of the limited function devices 12, 13 at a time and the full-function device 11, but not between the limited function devices 12, 13, the standard also provides what are called peer-to-peer topologies, in which every full-function device can communicate with every other full-function device.

The transmitting/receiving devices 11-13 are each composed of an antenna 14, a transmitting unit (transmitter, TX) 15 associated with the antenna, a receiving unit (receiver, RX) 16 associated with the antenna, and a control unit (control unit, CTRL) 17 associated with the transmitting and receiving units for controlling the transmitting and receiving units 15, 16. In addition, the transmitting/receiving devices 11-13 each include a power supply unit in the form of a battery or the like to supply energy to the units 15-17, as well as possible additional components such as sensors, actuators, etc.

The explanation below assumes that the data transmission takes place in the ISM (industrial, scientific, medical) band at 2.4 GHz. As explained in the introduction to the description, IEEE 802.15.4 specifies a total of 16 channels at 5 MHz intervals in this frequency band. For raw data rates of 250 kbit/s, band spreading with a chip rate of fC=2 Mchip/s and offset QPSK modulation (quadrature phase shift keying) is provided in these channels.

The transmitting unit 15 of each transmitting/receiving device converts the data stream to be transmitted in each case per IEEE 802.15.4 into a radio signal for radiation through its antenna 14 in that the data stream to be transmitted in each case is first converted into four-bit-wide symbols, and these are converted into consecutive PN sequences (pseudo noise). The consecutive PN sequences are then offset QPSK modulated, with half-sine pulse shaping, spectrally shifted into one of the aforementioned 16 channels, and finally amplified for transmission. In this context, each transmitting/receiving device is assigned a different channel so that each channel is occupied by a maximum of one transmitting/receiving device at any point in time.

The receiving unit 16 of each transmitting/receiving device converts a radio signal—received by its antenna 14 and generated per IEEE 802.15.4 by the transmitting unit of a second transmitting/receiving device—into the transmitted data in as error-free a manner as possible in that the received radio signal is filtered, transformed into the baseband, demodulated, and the data detected (decided), among other things. If a complete data frame (PPDU) is detected, it is delivered to the control unit 17 for further processing in accordance with the MAC layer.

In addition to the information channel component, i.e. the transmit signal transmitted in the desired channel by the second transmitting/receiving device, the received signal can contain adjacent channel components, i.e. transmit signals transmitted in spectrally adjacent channels by third transmitting/receiving devices. For example, if the information channel has a center frequency fCH=2440 MHz, the center frequencies of the most relevant adjacent channels according to the channel spacing specified in IEEE 802.15.4 are at fCH−5 MHz=2435 MHz ("left" adjacent channel) and at fCH+5 MHz=2445 MHz.

Conversely, the received signal may also contain adjacent channel components from third transmitting/receiving devices, but no information channel component from the second transmitting/receiving device. In this case, the task of the receiving unit 18 is to detect that the adjacent channel is occupied as quickly as possible and terminate the detection process in order to be available again for detection of possible subsequent information channel data as soon as possible.

The transmitting unit 15 and the receiving unit 16 of a transmitting/receiving device here are part of an integrated circuit (not shown in FIG. 1), for example of an ASIC (application specific integrated circuit) or of an ASSP (application specific standard product), while the control unit 17 is implemented by a microcontroller (likewise not shown). Advantageously, the transmitting/receiving device has only one integrated circuit (e.g. implemented as an ASIC or ASSP), which performs the functions of the transmitting unit 15, the receiving unit 16, and the control unit 17.

Figure 2:
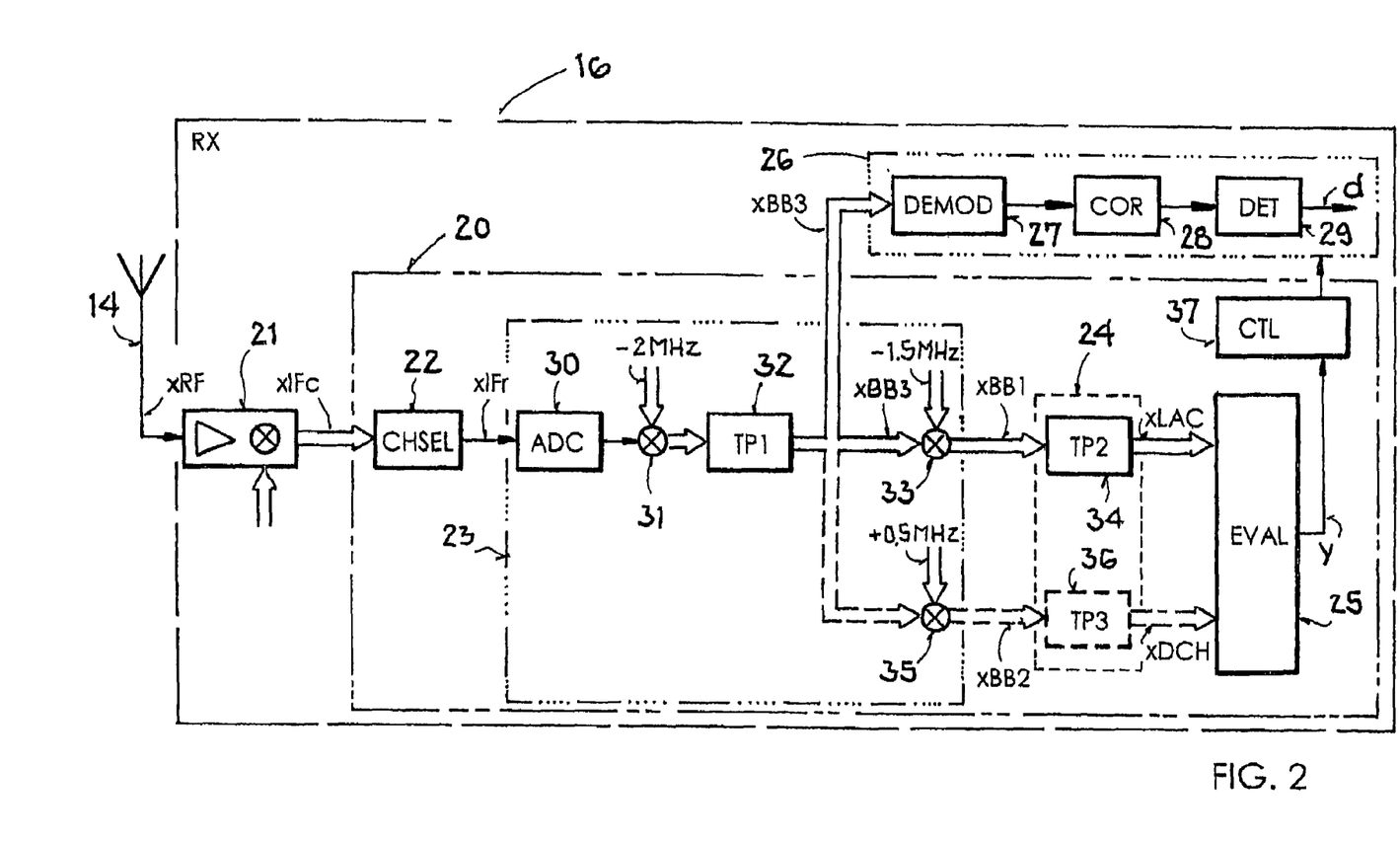
FIG. 2 illustrates exemplary embodiments of a receiving unit of a transmitting/receiving device per IEEE 802.15.4 with the inventive device.
Figure 3:
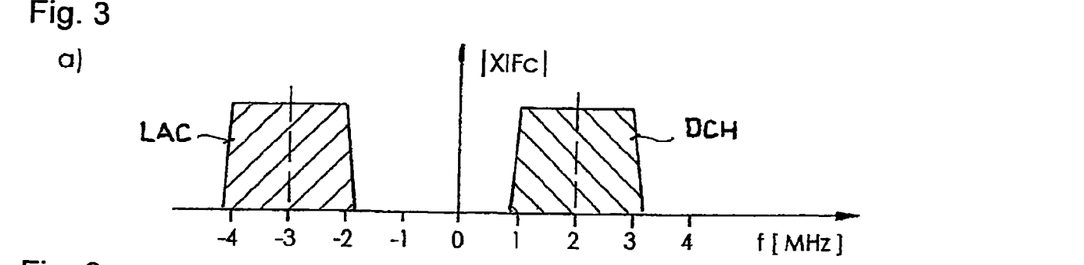
FIGS. 3a-e show absolute value spectra of various signals from FIG. 2.

FIG. 2 shows a block diagram of a receiving unit (RX) 16 with an inventive device 20 for detecting occupation of an adjacent channel by a signal with the aid of a complex-valued bandpass signal. FIG. 3 schematically shows the absolute value spectra of various signals from FIG. 2.

As shown in FIG. 2, the receiving unit 16 contains a mixer unit 21 connected to the antenna 14, a device 20 following the mixer unit 21 for detecting occupation of an adjacent channel by a signal, and a data detection unit 26 connected to the device 20. By means of the complex-valued bandpass signal xIFc provided by the mixer unit 21, the device 20 generates a binary occupation signal y that indicates whether the adjacent channel is occupied by a signal. Complex-valued signals or line connections for transmitting complex-valued signals are indicated in the Figures by arrows with double lines.

The device 20 has the following functional blocks connected in series: an analog filter unit (CHSEL) 22, a transformation unit 23, a digital filter unit 24, and an evaluation unit (EVAL) 25, which generates the binary occupation signal y. The analog filter unit 22 here is connected on the input side to the mixer unit 21, while the transformation unit 23 has an output connected to the data detection unit 26.

In a first example embodiment, the transformation unit 23 has the following functional blocks connected in series: an analog-to-digital converter (ADC) 30, a first mixer 31, a first low-pass filter (TP1) 32, and a second mixer 33. The analog-to-digital converter 30 here is connected on the input side to the analog filter unit 22, while the second mixer 33 is connected on the output side to the digital filter unit 24. The first low-pass filter 32 is again connected on the output side to the data detection unit 26.

The digital filter unit 24 contains a second low-pass filter (TP2) 34, which is connected on the input side to the second mixer 33 of the transformation unit 23, and on the output side to the evaluation unit 25.

In a second example embodiment, the transformation unit 23 additionally has a third mixer 35 and the digital filter unit 24 additionally has a third low-pass filter (TP3) 36. In this context, the third mixer 35 is connected on the input side to the first low-pass filter 32 and on the output side to the third low-pass filter 36, which in turn is connected on the output side to the evaluation unit 25.

In both example embodiments, the data detection unit 26, which is designed to detect the data values contained in the complex-valued bandpass signal xIFc, has a demodulation unit 27 connected on the input side to the first low-pass filter 32 of the transformation unit 23, a following correlation unit 28, and a detection unit 29 following the correlation unit 28.

The real-valued radio signal xRF received from the antenna 14, which—as described above with reference to FIG. 1—can have an information channel component and/or one or more spectrally separated adjacent channels, is first amplified in the mixer unit 21 by a low-noise amplifier (LNA) and is decomposed into an in-phase component (I) and a quadrature-phase component (Q) by a polyphase filter. The complex-valued receive signal (with real component I and imaginary component Q) thus produced is then converted to an intermediate frequency range with the aid of two mixers, thus forming the intermediate frequency signal xIFc (IF, intermediate frequency). The intermediate frequency signal xIFc is a complex-valued bandpass signal. The absolute value spectrum |XIFc| of the intermediate frequency signal xIFc is shown schematically in FIG. 3a. It is evident from FIG. 3a that, as a result of the conversion into the intermediate frequency range, the center frequency of the information channel component (desired channel, DCH) is at the intermediate frequency fIF=2 MHz, and the center frequency of the spectrally closest left adjacent channel component (left adjacent channel, LAC) is at fIF−5 MHz=−3 MHz. To simplify the representation, it is assumed in FIG. 3a that the average power of the DCH and LAC components is the same. On account of the relatively low value of the intermediate frequency fIF of 2 MHz, the receiving unit 16 shown in FIG. 2 is called a "low IF" receiving unit.

The analog filter unit 22, which functions as a channel selection filter (CHSEL), derives a real-valued bandpass signal xIFr in that the complex-valued bandpass signal xIFc is filtered by means of a (complex) third order Butterworth filter, and only the real component of the filtered signal is produced. In this way, the analog filter unit 22 is simple to implement and operates in an energy-saving way. Advantageously the values of the real component of the filtered signal are subsequently amplified in the filter unit 22 by a limiter amplifier, and limited to a maximum value such that the absolute real component values do not exceed the maximum value.

Since only the real component of the filtered signal is produced and further processed, the receiving unit 16 shown in FIG. 2 is called a "real-valued low IF" receiving unit. As a result of the real component production, the structure of the following functional blocks, and hence of the overall receiving unit, is simplified significantly. Thus, in advantageous fashion only one analog-to-digital converter, in particular, is required for the subsequent signal processing.

In FIG. 3b, the absolute value spectrum |XIFr| of the real-valued bandpass signal xIFr is shown schematically. As a result of the real component production, the adjacent channel component caused by the left adjacent channel (LAC) spectrally overlaps the information channel component (DCH), as can be seen from the regions in FIG. 3b, which both have cross-hatching.

The transformation unit 23 transposes the real-valued bandpass signal xIFr into a first and a third baseband signal xBB1 and xBB3, respectively, and optionally also into a second baseband signal xBB2, where all three baseband signals are complex-valued and digital. First the real-valued bandpass signal xIFr is sampled by the analog-to-digital converter 30, preferably with a sampling rate of 16 Msps (megasamples per second), and quantized with a bit width of preferably only one bit. The resultant real-valued digital IF signal is then shifted into the baseband with the aid of the first mixer 31, and low-pass filtered by the (complex) first low-pass filter (TP1) 32 with a bandwidth of 2 MHz. The third baseband signal xBB3 thus produced has, in turn, an information channel component (DCH) and/or an adjacent channel component (LAC), as is evident from the schematic representation of its absolute value spectrum |XBB3| in FIG. 3c.

The third baseband signal xBB3 is supplied both to the demodulation unit 27 in the data detection unit 26 and to the second mixer 33. In the data detection unit 26, the data contained in the information channel component of the third baseband signal xBB3 are detected in as error-free a manner as possible with the aid of the demodulation unit 27, the correlating unit (PN despreader) 28, and the detection unit 29. The second mixer 33 spectrally shifts the third baseband signal xBB3 to the left by 1.5 MHz. The first baseband signal xBB1 thus obtained is supplied to the (complex) second low-pass filter (TP2) 34 of the digital filter unit 24.

The second low-pass filter (TP2) 34 of the digital filter unit 24 filters the first baseband signal xBB1 such that spectral components influenced by the information channel component (DCH) are suppressed, and provides a complex-valued first filtered signal xLAC. The absolute value spectrum |xLAC| of the first filtered signal xLAC is shown schematically in FIG. 3d. It is evident that this signal has only the adjacent channel component (LAC). Preferably the second low-pass filter 34 consists of a series-connection of a first complex FIR filter (finite impulse response), a sampling rate reducer by the factor 2, and a second complex FIR filter, so that the overall result is a simply constructed low-pass filter with a bandwidth of approximately 0.5 MHz.

The evaluation unit 25 evaluates the first filtered signal xLAC and generates a binary occupation signal y to indicate occupation of the adjacent channel as a function of the evaluated first filtered signal. Such an evaluation unit is described below with reference to FIG. 4.

As shown in FIG. 2, the device 20 also has a control unit (CTL) 37 connected to the evaluation unit 25 and the data detection unit 26; the binary occupation signal y is supplied to this control unit. The control unit 37 controls the data detection unit 26 as a function of the binary occupation signal y such that the current detection process is terminated or receive mode is exited as soon as the binary occupation signal y indicates (signals) occupation of the adjacent channel, and is switched to a "Listen Mode" in which the receiving unit 16 again checks the channel for the presence of an IEEE 802.15.4 signal. To this end, the control unit 37 is preferably connected to the data detection unit 26, which immediately terminates the current receive process, i.e. discards the data from the frame currently being received if it is instructed to do so by the control unit 37. As a result, the transmission of the LAC frame from the receiving unit 16 to the control unit 17 is suppressed, which on the one hand permits energy-saving operation of the transmitting/receiving device and on the other hand has the effect that the receiving unit 16 is once again ready to receive a data frame in the information channel (DCH) at an earlier point in time.

According to a second example embodiment, the transformation unit 23 additionally generates a second baseband signal xBB2 in that the third baseband signal xBB3 is shifted spectrally to the right by 0.5 MHz with the aid of the third mixer 35. The (complex) third low-pass filter 36 of the digital filter unit 24, which preferably is implemented in similar fashion to the second low-pass filter 34, filters the second baseband signal xBB2 such that spectral components influenced by the left adjacent channel (LAC) are suppressed, and provides a complex-valued second filtered signal xDCH. The absolute value spectrum |XDCH| of the second filtered signal xDCH is schematically represented in FIG. 3e. It is evident that this signal has only the information channel component (DCH). In the second example embodiment, the evaluation unit 25 evaluates both the first filtered signal xLAC and the second filtered signal XDCH, and generates a binary occupation signal y to indicate occupation of the adjacent channel as a function of both evaluated signals. Such an evaluation unit is likewise described below with reference to FIG. 4.

Figure 4:
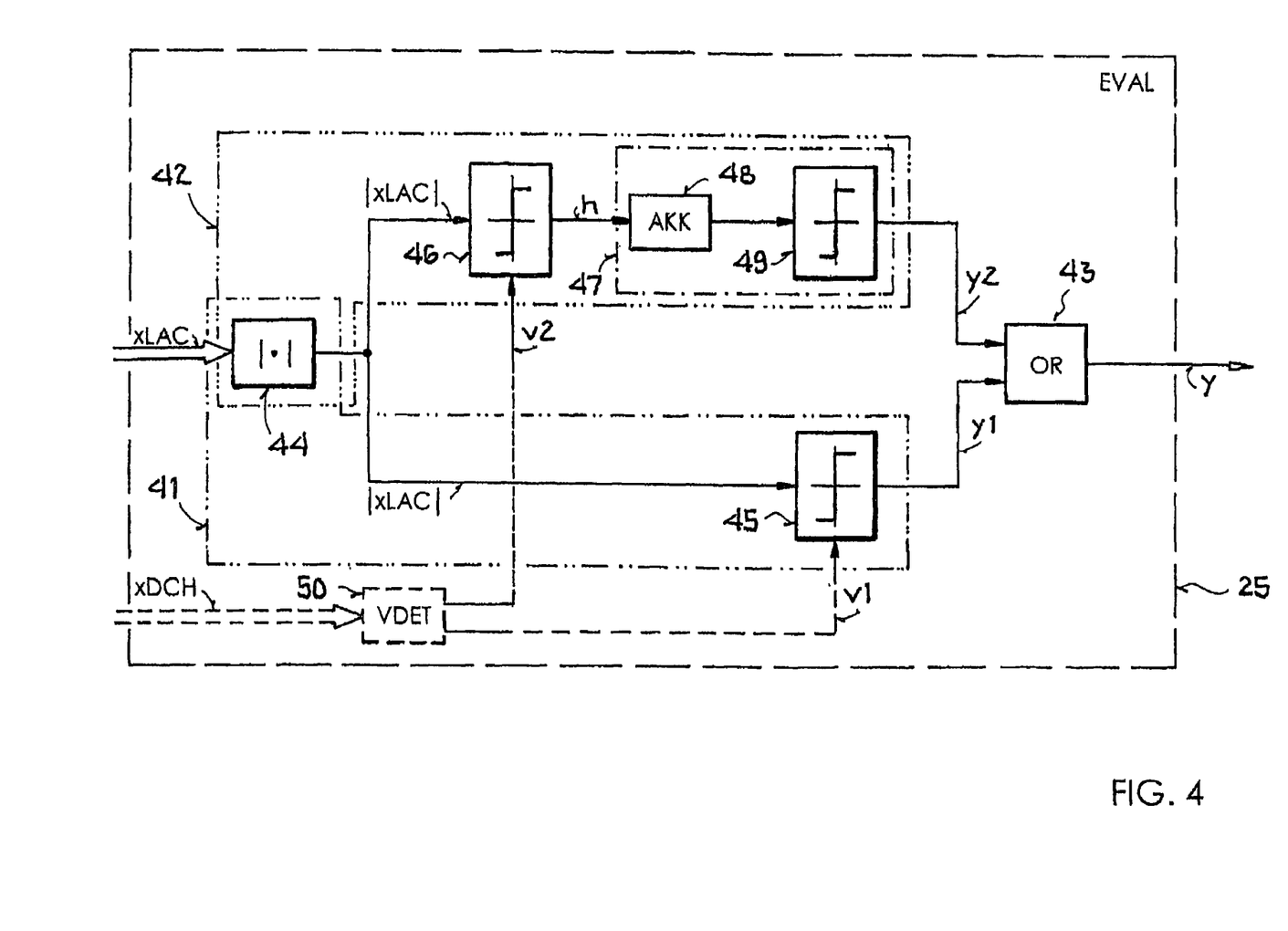
FIG. 4 shows exemplary embodiments of the evaluation unit from FIG. 2.

FIG. 4 shows a block diagram of the evaluation unit (EVAL) 25 from FIG. 2. In accordance with the first example embodiment, the evaluation unit 25 has a first evaluation unit 41, a second evaluation unit 42, and an OR gate 43. The two evaluation units 41, 42 are connected on the input side to the second low-pass filter (TP2) 34 from FIG. 2, and on the output side to two inputs of the OR gate 43. The binary occupation signal y is obtained at the output of the OR gate 43, which corresponds to the output of the evaluation unit 25.

The first evaluation unit 41 generates a first binary signal y1 in that the values of the first filtered signal xLAC are evaluated individually, i.e., for each value of the first binary signal y1, exactly one value (namely the current value) of the first filtered signal xLAC is evaluated, so that instantaneous evaluation takes place. The second evaluation unit 42 generates a second binary signal y2 in that the values of the first filtered signal xLAC are evaluated by means of a moving window, i.e., for each value of the second binary signal y2, multiple values (namely the current and past values) of the first filtered signal xLAC are evaluated, so that evaluation with memory takes place. Finally, the OR gate 43 generates the binary occupation signal y by using a logic OR operation to combine the first binary signal y1 with the second binary signal y2.

The first evaluation unit 41 contains an absolute-value generation unit 44 connected on the input side to the second low-pass filter (TP2) 34 from FIG. 2 and a following first decision unit 45, which is connected on the output side with a first input of the OR gate 43. First the absolute values |xLAC| of the first filtered signal values xLAC are produced in the absolute-value generation unit 44. Then the values |xLAC| are compared with a first comparison value V1 in the first decision unit, and the first binary signal y1 is produced in such a manner that it takes on a value of logic 1 if the corresponding absolute value of the first filtered signal xLAC exceeds the first comparison value V1, and takes on a value of logic 0 if this is not the case. In a preferred embodiment, the comparison value V1 is a threshold value, which advantageously is defined as a value in the range of approximately 75%-95% of the maximum possible absolute value of the first filtered signal xLAC.

The second evaluation unit 42 has the following functional blocks connected in series: the absolute-value generation unit 44, a second decision unit 46, and a median determination unit 47 including a window accumulator 48 with following third decision unit 49, wherein the median determination unit 47 or the third decision unit 49 is connected on the output side to a second input of the OR gate 43.

In the second decision unit 46, the absolute values |xLAC| of the first filtered signal values produced in the absolute-value generation unit 44 are compared to a second comparison value V2, and a binary auxiliary signal h is generated such that it takes on a value of logic 1 if the corresponding absolute value of the first filtered signal xLAC exceeds the second comparison value V2, and takes on a value of logic 0 if this is not the case. In a preferred embodiment, the comparison value V2 is a threshold value, which advantageously is defined essentially as the average of the minimum and maximum possible values of the first filtered signal xLAC.

The median determination unit 47 generates the second binary signal y2 such that each value of the second binary signal y2 indicates a median of N values of the binary auxiliary signal h, where N designates the window size. To this end, the window accumulator 48 performs moving accumulation of N values of the binary auxiliary signal h at a time, so that, in the third decision unit 49 the second binary signal y2 can be produced in such a manner that it takes on a value of logic 1 if the corresponding accumulated value exceeds a value of essentially N/2, and takes on a value of logic 0 if this is not the case. Preferably the window size is chosen as N=16.

Alternatively, in place of the window accumulator 48, an average value determination unit can be provided, which performs a moving average of the values of the binary auxiliary signal h (if applicable, in a weighted form or RMS average value) in order to produce the input signal for the third decision unit 49. In addition, a more complex non-binary average value determination unit can be provided, which directly averages the absolute values |xLAC| of the first filtered signal values in order to produce the input signal for the third decision unit 49.

According to the second example embodiment, the evaluation unit 25 evaluates both the first filtered signal xLAC and the second filtered signal xDCH present at the second input, and generates the binary occupation signal y as a function of both evaluated signals. Preferably the evaluation unit 25 additionally contains for this purpose a comparison value determination unit (VDET) 50, which is connected on the input side to the third low-pass filter 36 and on the output side to the first decision unit 45 and the second decision unit 46, and which uses the second filtered signal XDCH as a basis for determining comparison values V1 and V2 as a function of this signal. To determine the comparison value V2, the absolute value of the second filtered signal xDCH is averaged (unweighted/weighted averaging, RMS averaging, median determination, etc.), for example, while the comparison value V1 is determined, for example, by averaging only the third of the values of xDCH which have the largest absolute values.

Even though the present invention has been described above on the basis of example embodiments, it is not restricted thereto, but can instead be modified in multiple ways. Thus, for example, the invention is neither restricted to WPANs per se, nor to WPANs per IEEE 802.15.4 nor to the band spreading methods, modulation methods, frequency bands, bit rates, symbol rates, chip rates, and number of levels, etc., specified therein, nor to the stated values of the intermediate frequency, sampling frequency, filter bandwidths, filter types, and filter orders, etc. Rather, the invention can be used to advantage in an extremely wide variety of wireless or wired FDMA communications systems.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting occupation of an adjacent channel by a signal with a complex-valued bandpass signal having an information channel component and/or an adjacent channel component, the method comprising the steps of:

deriving a real-valued bandpass signal in that the complex-valued bandpass signal is filtered and a real component is produced from the filtered signal;

transposing the real-valued bandpass signal into a first baseband signal;

filtering the first baseband signal so spectral components influenced by the information channel component are suppressed to provide a first filtered signal;

evaluating the first filtered signal; and generating a binary occupation signal to indicate the occupation of the adjacent channel as a function of the evaluated first filtered signal.

2. The method according to claim 1, wherein the evaluation of the first filtered signal includes a median determination from values of a binary signal that is a function of the first filtered signal.

3. The method according to claim 1, wherein the evaluation of the first filtered signal includes an average value determination from values of a binary signal that is a function of the first filtered signal.

4. The method according to claim 1, wherein the evaluation of the first filtered signal comprises the following steps:

generating a first binary signal such that the values of the first filtered signal are individually evaluated;

generating a second binary signal such that the values of the first filtered signal are evaluated by a moving window; and generating the binary occupation signal by a logic OR operation to combine the first binary signal with the second binary signal.

5. The method according to claim 4, wherein the values of the first filtered signal are individually evaluated in that their absolute values are compared with a first comparison value, and the first binary signal takes on a value of logic 1 if the corresponding absolute value of the first filtered signal exceeds the first comparison value and takes on a value of logic 0 otherwise.

6. The method according to claim 5, wherein the first comparison value is a threshold value.

7. The method according to claim 4, wherein each value of the second binary signal indicates a median of N values of a binary auxiliary signal, where N designates the window size, and the binary auxiliary signal is a function of the first filtered signal.

8. The method according to claim 7, wherein the absolute values of the first filtered signal are compared with a second comparison value, and the binary auxiliary signal takes on a value of logic 1 if the corresponding absolute value of the first filtered signal exceeds the second comparison value, and takes on a value of logic 0 otherwise.

9. The method according to claim 8, wherein the second comparison value is a threshold value.

10. The method according to claim 1, further comprising the steps of:

transposing the real-valued bandpass signal into a second baseband signal;

filtering the second baseband signal such that spectral components influenced by the adjacent channel component are suppressed to provide a second filtered signal;

evaluating the second filtered signal; and generating the binary occupation signal as a function of the evaluated first filtered signal and the evaluated second filtered signal.

11. The method according to claim 10, wherein the first comparison value is a function of the second filtered signal.

12. The method according to claim 10, wherein the second comparison value is a function of the second filtered signal.

13. The method according to claim 1, further comprising the steps of:

detecting the data values contained in the complex-valued bandpass signal; and terminating the detection step when the binary occupation signal indicates occupation of the adjacent channel.

14. A device for detecting occupation of an adjacent channel by a signal with a complex-valued bandpass signal having an information channel component and/or an adjacent channel component, the device comprising:

an analog filter unit that derives a real-valued bandpass signal in that the complex-valued bandpass signal is filtered and a real component is produced from the filtered signal;

a transformation unit connected to the analog filter unit and that transposes the real-valued bandpass signal into a first baseband signal;

a digital filter unit connected to the transformation unit and that filters the first baseband signal such that spectral components influenced by the information channel component are suppressed, and to provide a first filtered signal; and an evaluation unit connected to the digital filter unit and that evaluates the first filtered signal and generates a binary occupation signal to indicate the occupation of the adjacent channel as a function of the evaluated first filtered signal.

15. The device according to claim 14, wherein the evaluation unit has a median determination unit that determines a median from values of a binary signal that is a function of the first filtered signal.

16. The device according to claim 14, wherein the evaluation unit has an average value determination unit that determines an average from values of a binary signal that is a function of the first filtered signal.

17. The device according to claim 14, wherein the evaluation unit comprises:

a first evaluation unit connected to the digital filter unit and generates a first binary signal in that the values of the first filtered signal are individually evaluated;

a second evaluation unit connected to the digital filter unit and generates a second binary signal in that the values of the first filtered signal are evaluated by a moving window; and an OR gate connected to the first evaluation unit and to the second evaluation unit and that generates the binary occupation signal by using a logic OR operation to combine the first binary signal with the second binary signal.

18. The device according to claim 17, wherein the first evaluation unit comprises:

an absolute-value generation unit connected to the digital filter unit and produces absolute values of the first filtered signal values;

a first decision unit connected to the absolute-value generation unit and compares the absolute values of the first filtered signal values to a first comparison value and generates the first binary signal such that it assumes a value of logic 1 if the corresponding absolute value of the first filtered signal exceeds the first comparison value and takes on a value of logic 0 otherwise.

19. The device according to claim 17, wherein the second evaluation unit has a median determination unit that generates the second binary signal such that each value of the second binary signal indicates a median of N values of a binary auxiliary signal, where N designates the window size, and the binary auxiliary signal is a function of the first filtered signal.

20. The device according to claim 19, wherein the second evaluation unit comprises:

an absolute-value generation unit connected to the digital filter unit and generates the absolute values of the first filtered signal values;

a second decision unit connected to the absolute-value generation unit and compares the absolute values of the first filtered signal values to a second comparison value and generates the binary auxiliary signal such that it assumes a value of logic 1 if the corresponding absolute value of the first filtered signal exceeds the second comparison value and takes on a value of logic 0 otherwise;

a window accumulator connected to the second decision unit and performs moving accumulation of N values of the binary auxiliary signal at a time; and a third decision unit connected to the window accumulator and designed to generate the second binary signal such that it assumes a value of logic 1 if the corresponding accumulated value exceeds a value of essentially N/2, and takes on a value of logic 0 otherwise.

21. The device according to claim 14, wherein
the transformation unit transposes the real-valued bandpass signal into a second baseband signal,
the digital filter unit filters the second baseband signal such that spectral components influenced by the adjacent channel component are suppressed and provides a second filtered signal,
the evaluation unit evaluates the second filtered signal and generates the binary occupation signal as a function of the evaluated first filtered signal and evaluated second filtered signal.

22. The device according to claim 21, wherein the evaluation unit provides a first comparison value as a function of the second filtered signal.

23. The device according to claim 21, wherein the evaluation unit provides a second comparison value as a function of the second filtered signal.

24. The device according to claim 14, further comprising:
a control unit connected to the evaluation unit for controlling a data detection unit, which detects the data values contained in the complex-valued bandpass signal,
wherein the control unit instructs the data detection unit to terminate the current detection process when the binary occupation signal indicates occupation of the adjacent channel.

25. Transmitting/receiving device for a data transmission system, comprising an antenna, a receiving unit associated with the antenna to receive data, and a device for detecting occupation of an adjacent channel according to claim 14.

26. The transmitting/receiving device according to claim 25, wherein the device for detecting occupation of an adjacent channel is an integrated circuit.

* * * * *